Oct. 18, 1927.
J. CHRISTIE
1,645,894
SPOOL HOLDER FOR CAMERAS
Filed Jan. 5, 1927
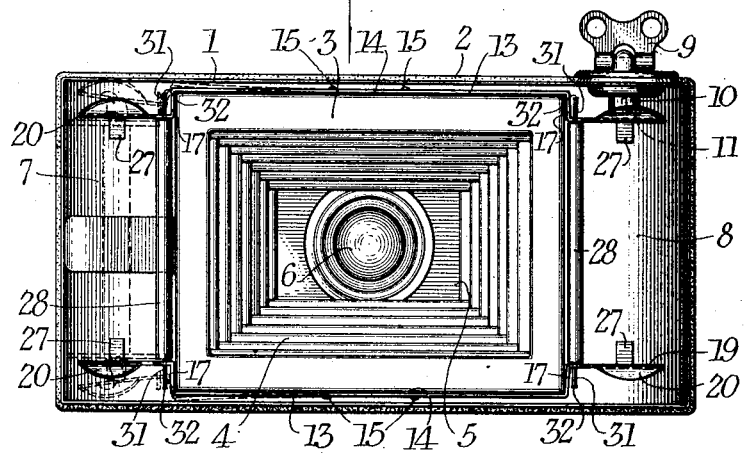
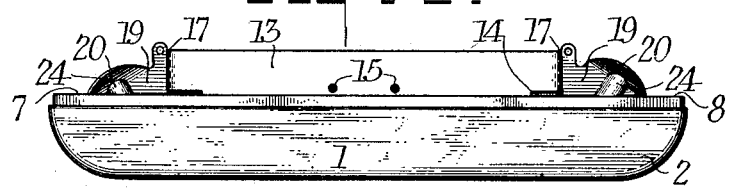
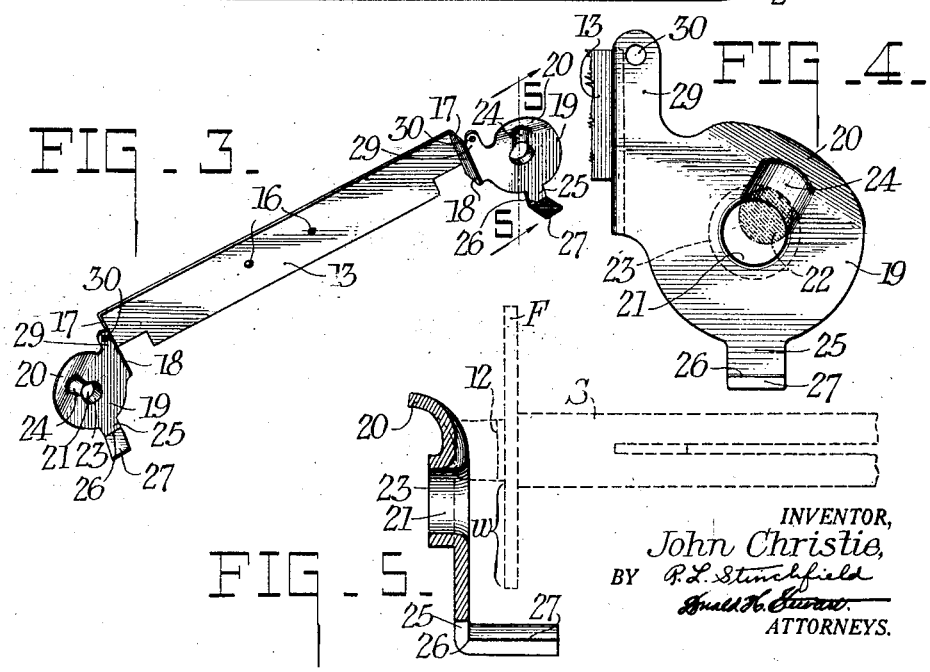
INVENTOR,
John Christie,
BY
ATTORNEYS.

Patented Oct. 18, 1927.

1,645,894

UNITED STATES PATENT OFFICE.

JOHN CHRISTIE, OF ROCHESTER, NEW YORK, ASSIGNOR TO EASTMAN KODAK COMPANY, OF ROCHESTER, NEW YORK, A CORPORATION OF NEW YORK.

SPOOL HOLDER FOR CAMERAS.

Application filed January 5, 1927. Serial No. 159,185.

This invention relates to photography and more particularly to a spool holding structure for use in photographic roll holding film cameras. One object of my invention is to provide a simple and compact spool holding structure which can be easily assembled in a camera. Another object is to provide a spool holding structure in which the spool supporting members at both ends of the camera body may be easily and accurately aligned. Another object is to provide a film roller which is mounted upon the spool holding members and which has a slidable connection therewith, and other objects will appear from the following specification, the novel features being pointed out in the claims at the end thereof.

In the drawing wherein like reference characters denote like parts throughout:

Fig. 1 is a top plan view of a camera having roll holding mechanism constructed in accordance with and embodying one form of my invention, the back of the camera being removed;

Fig. 2 is a side elevation of the camera shown in Fig. 1 with the camera back removed;

Fig. 3 is a perspective view of one of the spring supporting members;

Fig. 4 is an enlarged detailed side elevation of one of the spool supporting members;

Fig. 5 is an enlarged detailed section on line 5—5 of Fig. 1.

In the preferred embodiment of my invention shown in the drawings the camera may consist of the usual body portion 1, which is preferably of metal and which may be covered by a leather or an imitation leather covering 2 in the central part of the camera body. There is a bellows frame 3 and bellows 4 which extends forwardly to a lensboard 5 which carries the usual objective.

Spool chambers 7 and 8 are provided at each end of the bellows frame 3 and a winding key 9 is affixed to one end of one spool chamber here shown as 8. This key is of the usual type which may be turned in one direction only and which preferably consists of a tubular portion 10 in which a web 11 is affixed to engage the usual slot 12 in a film spool.

The spool holding structure comprises a pair of spring plates 13 which are attached at their central portion to the side walls 14 of the camera body by means of rivets 15 passing through apertures 16. Each end of the spring members 13 are offset at 17 and then bent again at 18 so as to terminate in ends 19 which are substantially parallel to the spring members 13.

All four of the spool holding members are alike. As best shown in Figs. 4 and 5 each member 19 consists of a substantially circular plate having an upper edge 20 bent outwardly and having a central aperture 21 adapted to receive a spool trunnion 22. I prefer to form a tubular extension 23 from the edge of aperture 21 since this forms a better bearing for the spool trunnion and eliminates the possibility of a rough edge which might occur around aperture 21 from cutting into the relatively soft metal (usually aluminum) of which the spool trunnions are made.

From the bent over flange 20 I provide a spool guideway or channel 24 leading directly to the aperture 21. This greatly facilitates loading as it directs the film spool automatically in the apertures 21.

On the lower edge of disk 19 an arm 25 is extended and this arm is bent at 26 to form a foot 27 which is spaced from aperture 21 a distance approximately equal to that of the width of a spool flange, as indicated at $w$, Fig. 5. This foot 27 forms a stop which limits the downward movement of the spool so that in case the spool trunnions should fail to engage the guideways 24 the spool cannot be thrust too far down into the spool chamber.

It is important to have the film spool holders and the film guide rollers properly aligned so that the film may be readily wound across the bellows frame 3 and held with the film in the proper focal plane.

For this reason the film rollers 28 are preferably mounted upon brackets 29 which are integral with the spring arms 13 and which are provided with apertures 30 into which the elongated trunnions of rollers 28 may extend, as shown in Fig. 1. These trunnions are preferably deformed or slightly headed over at 32 so that they will not pull through the apertures 30, and so that they may tend to limit the relative movement between the spool holding flanges 19 and the rollers 28.

With the construction above described a pair of spring members 13 may be attached to each side of the bellows frame 3 by means of a pair of rivets 15. These four rivets are the sole locating means for the four spool holding members 19 and the four guide roll holding brackets 29. Thus the relative location of these parts can be accurately obtained without separate adjustments.

The operation of the above described spool holding mechanism is as follows:

A film spool S may be thrust into a spool chamber, the trunnions 22 being directed by guideways 24 into the bearing 23. As the spool trunnions pass down the guideways 24, parts 19 will be thrust apart, as indicated in broken lines, Fig. 1. This movement is permitted because of the spring metal of which arms 13 are made, and the trunnions 31 of the guide rollers 28 will permit the brackets 29 to also spring outwardly with the spool bearings 23. When the trunnions reach and snap into the bearings 23 the spool holders will spring back into the position shown in Fig. 1.

In loading a film spool into the spool chamber 8 (where the winding key is located) the procedure is similar to that above described except that the slotted end of the film spool is first inserted into the tubular end 10 of the film winding key 9, and the opposite end of the spool is snapped down into place.

Unloading is even simpler than loading since it is only necessary to press one flange F of the film spool S towards the end wall of the camera, thus causing one spool support to swing to its outermost position, thus releasing the opposite spool trunnion from its bearing 23.

Having thus described my invention, what I claim as new and desire to secure by Letters Patent is,—

1. In a photographic camera, the combination with a camera body including side and end walls, spool chambers being located adjacent the end walls, of a film winding mechanism including film guiding rollers and film spool supports, the supports comprising a pair of spring arms attached to the camera body near the middle portion thereof, film spool engaging members on the ends of the spring arms, and a slidable connection between the spring arms and guide rollers whereby the latter may be supported by the former throughout the range of movement of the spring arms.

2. In a photographic camera, the combination with a camera body including side and end walls, spool chambers being located adjacent the end walls, of a film winding mechanism including film guiding rollers and film spool supports, the supports comprising a pair of perforated spring arms, relatively long trunnions on the guide rollers passing through the perforated spring arms, film spool engaging members on the spring arms, the guide roller trunnions permitting movement of the spring arms to engage and disengage a film spool.

3. In a photographic camera, the combination with a camera body including side and end walls, spool chambers being located adjacent the end walls, of a film winding mechanism including film guiding rollers and film spool supports, the supports comprising a pair of spring arms attached to the camera body near the middle portion thereof, film spool engaging members on the ends of the spring arms, a slidable connection between the spring arms and the guide rollers, and means for limiting the extent of the sliding movement.

4. In a photographic camera, the combination with a camera body including side and end walls, spool chambers being located adjacent the end walls, of a film winding mechanism including film guiding rollers and film spool supports, the supports comprising a pair of perforated spring arms, relatively long trunnions on the guide rollers passing through the perforated spring arms, film spool engaging members on the spring arms, heads on the guide roller trunnions for limiting the relative movement between a spring arm and a guide roller trunnion.

5. In a photographic camera, the combination with a camera body including side and end walls with spool chambers included in the end walls, spool supports including spring arms carried by the camera body being attached thereto near the center thereof, and guideways formed in the spool supports adapted to direct a spool being loaded into the camera into the spool holders.

6. In a photographic camera, the combination with a camera body including side and end walls with spool chambers included in the end walls, spool supports including spring arms carried by the camera body being attached thereto near the center thereof, spool bearings carried by the ends of the spring arms, guideways leading to the spool bearings for directing spool trunnions into the bearings.

7. In a photographic camera, the combination with a camera body having sides and spool chambers at the ends thereof, of spool holders comprising spaced spring arms attached to the sides of the camera body, spool supports carried by said arms including tubular bearings adapted to receive the spool trunnions, said spring arms being movable to engage and release spool trunnions in the tubular bearings.

8. In a photographic camera, the combination with a camera body having sides and spool chambers at the ends thereof, of spool holders comprising spaced spring arms attached to the sides of the camera body, spool supports carried by said arms including tubular bearings adapted to receive the spool trunnions, and guideways leading to the spool bearings whereby a spool having trunnions may be moved down the guideways and snapped into the spool bearings.

9. In a photographic camera, the combination with a camera body having sides and spool chambers at the ends thereof, of spool holders comprising spaced spring arms attached to the sides of the camera body, spool supports carried by said arms including plates having tubular bearings therein, outwardly flaring parts on the plates, and guideways leading from the outwardly flaring portions of the plates to the tubular bearings whereby spool trunnions may be directed to the bearings.

Signed at Rochester, New York, this 30th day of December, 1926.

JOHN CHRISTIE.